United States Patent [19]

Hoppe et al.

[11] Patent Number: 5,538,759
[45] Date of Patent: Jul. 23, 1996

[54] EPOXY-FREE, HEAT-CURABLE COATING SYSTEM

[75] Inventors: Manfred Hoppe; Andreas Kaplan; René Gisler, all of Chur, Switzerland

[73] Assignee: EMS-Inventa AG, Zurich, Switzerland

[21] Appl. No.: 518,275

[22] Filed: Aug. 23, 1995

[30] Foreign Application Priority Data

Aug. 26, 1994 [DE] Germany ............... 44 30 399.8

[51] Int. Cl.$^6$ ................................. C08L 67/02
[52] U.S. Cl. ............ 427/385.5; 427/375; 427/421; 525/440; 525/934
[58] Field of Search ................. 525/440, 934; 427/385.5, 375, 421

[56] References Cited

U.S. PATENT DOCUMENTS 3,842,035  10/1974  Klaren .
4,920,173  4/1990  Gras .................................. 525/440

FOREIGN PATENT DOCUMENTS 0364608  10/1989  European Pat. Off. .
2324696  5/1973   Germany .
3232463  9/1982   Germany .
4007300  3/1990   Germany .

Primary Examiner—Patricia A. Short
Attorney, Agent, or Firm—Browdy and Neimark

[57] ABSTRACT

A heat-curable, epoxy-free coating system of binder resin is based on a hydroxyl-terminated polyester resin (a) with a hydroxyl number of from 20 to 200 mg KOH/g and a glass transition temperature of at least 40° C., a carboxyl-group-containing, reversibly blocked polyisocyanate (b) and a b-hydroxyalkylamide (c) having at least two b-hydroxyalkylamide groups per molecule, and optionally further additives dictated by the usage and processing.

8 Claims, No Drawings

5,538,759

1

EPOXY-FREE, HEAT-CURABLE COATING SYSTEM

FIELD OF INVENTION

The invention relates to epoxy-free, heat-curable binder resin coating systems on the basis of hydroxyl-terminated polyester resins, blocked polycyanates containing carboxyl groups, and b-hydroxyalkylamides.

BACKGROUND

When heat-curable resin powder coatings are applied, they do not give off any organic solvents and therefore have clear ecological advantages over liquid coating compositions including paints. The cross-linking of such resins under heat takes place by way of polyaddition or polycondensation reactions between the functional groups contained in the resin binders. Typical binder systems are epoxy resins/curing agents; carboxyl-polyester/epoxies, hydroxyl-polyester/isocyanates, hydroxyl-acrylates/isocyanates, carboxyl-acrylates/epoxies, epoxy-acrylates/dicarboxylic acids, carboxyl-polyester/or carboxyl-acrylates/b-hydroxyalkylamides, and so forth. The binder systems listed differ from one another not only in their technical properties as paints and coating layers, but especially in their resistance to outdoor weathering; but all have high-gloss surfaces, or in other words a gloss index of >80 (DIN 67530, angle of incidence 60°). There is presently an increasing need for coated layers from powder with matte or semigloss surfaces with a gloss index of <60 at an angle of incidence of 60° (DIN 67530) and good outdoor weathering resistance for applications such as architecture, automobiles, and furniture.

The matting additives usual in the liquid paint industry, such as chalks, finely dispersed silicic acids and oxides, talc, etc., exhibit only a very slight matting effect in powdered paints, and when added in relatively large quantities they make the technical properties for painting purposes unacceptably worse. Although additives that are incompatible with the binder, such as waxes, etc., do produce so-called silken-sheen surfaces (gloss index >60 at an angle incidence of 60°), nevertheless in actual use the enrichment of incompatible additives has undesirable effects on the surface.

U.S. Pat. No. 3,842,035 therefore proposes preparing matte powdered paint coatings by what is known as dry-blending of finished powdered paints of adequately differing reactivity, in other words powdered paints with very short and very long gelation times. Although this process leads to coatings of the desired matte quality, nevertheless dry blending of finished powdered paints is very complicated and expensive, and demixing, especially with overspray return, means that a. uniform, reproducible surface is no longer assured. There has accordingly been no lack of attempts to produce powder coating surfaces with a matte surface by coextrusion of all the components without demixing problems and with good replicability.

German Patent Disclosure DE-A 2 324 696 proposes a process for preparing matte coatings by using a special curing agent that reacts with epoxy groups, the agent being the salt of cyclic amidines, with certain polycarboxylic acids. Cross-linking of the powdered paint occurs in this process with differing reactivity at different temperatures, and as a result microstructures that have a matte surface form on the coating surface. However, the use of this process is limited to epoxy- and carboxyl-polyester/epoxy powdered paints, with the exception of carboxyl-polyester/triglycidylisocanurate (TGIC) powdered paints, and therefore powdered paints with adequate outdoor weathering resistance cannot be produced by this process.

European Patent Disclosure EP 0 366 608 B1 also proposes a process for producing powdered paints with matte surfaces. It relates to powdered paints based on epoxy resins or epoxy compounds, such as triglycidylisocyanurate (TGIC) and mixtures of di-, tri- or tetrakis-(b-carboxyethyl)cyclohexanones, or di-, tri- or tetrakis-(b-carboxyethyl) cyclopentanones, and carboxyl-terminated polyester resins. The matte effect is ascribed here to the differing reactivity between the aliphatic carboxyl groups of the cross-linking agent and the aromatic carboxyl groups of the carboxyl-terminated polyester resin.

Finally, German Patent Disclosure DE-A 3 232 463 describes the production of coatings with matte surfaces from a powder binder system based on hydroxyl-terminated polyester resins, epoxy compounds such as TGIC, and special reversibly blocked polyisocyanates with free carboxyl groups as cross-linking agents. The blocked polyisocyanates contain more than one blocked isocyanate group per molecule, have an acid value of from 20 to 150 mg KOH/g, preferably 25 to 80 mg KOH/g, and an NCO content/acid value quotient of 0.075 to 0.340, preferably 0.100 to 0.300. This disclosure states it to be especially surprising that the acid value or the NCO content is not solely responsible for the attainment of matte surfaces, but rather the ratio between isocyanate and carboxyl groups, even though under the usual curing conditions for powdered paints, isocyanate groups and carboxyl groups react hardly at all with one another. With a binder system described in another patent reference (EP A 0 056 167), which also has a blocked polyisocyanate cross-linking agent containing carboxyl groups but has a different ratio of isocyanate to carboxyl, only high-gloss coatings are therefore attained.

Although the processes proposed in the patent disclosures EP 0 366 608 B1 and DE A 3 323 463, after coextrusion of all the components, lead to matte surfaces with good outdoor weathering resistance, nevertheless both binder systems have the substantial disadvantage that they contain epoxy compounds, especially triglycidylisocanurate (TGIC), and are therefore extraordinarily objectionable on toxicological grounds.

SUMMARY OF INVENTION

An object of the invention is to overcome deficiencies in the prior art such as indicated above, and especially to make available an epoxy-free, heat-curable resin powder coating system that can be made by coextrusion of all the components and that in contrast to the prior art is absolutely unobjectionable toxicologically and can be used to produce especially weather-resistant protective coatings with matte surfaces.

This object is attained by the epoxy-free heat-curable coating system of binder resin on the basis of at least one hydroxyl-terminated polyester resin (a) with a hydroxyl number in the range from 20 to 200 mg KOH/g and a glass transition temperature of at least 40° C., at least one carboxyl-group-containing, reversibly blocked polyisocyanate (b) having at least two blocked isocyanate groups per molecule and an acid value of from 20 to 150 mg KOH/g, and at least one b-hydroxyalkylamide (c) having at least two b-hydroxyalkylamide groups per molecule, and optionally further additives dictated by the usage and processing; its use in the manufacture of matte and semi-coatings; and its manufacture by the co-extrusion of components (a), (b) and (c), optimally with additives, in melt form at 80°–130° C., followed by cooling, granulating, further grinding as may be needed, and screening to a particle size no greater than 90 mm.

The invention therefore more generally relates in particular to a coating system based on hydroxyl-terminated polyester resins and carboxyl-group-containing, reversibly blocked polyisocyanates and b-hydroxyalkylamides as cross-linking agents.

DETAILED DESCRIPTION OF EMBODIMENTS

The invention thus comprises a coating system, suitable for a two-stage cross-linking, whose hydroxyl-terminated polyester resin is suitable a) primarily for cross-linking with b-hydroxyl-alkylamide, and b) subsequently, at temperatures of approximately 160° C., after deblocking of the polyisocyanate, for further cross-linking.

The epoxy-free, heat-curable, weather-resistant and toxicologically unobjectionable coating system according to the invention thus comprises:

a hydroxyl-terminated polyester resin with a hydroxyl number in the range from 20 to 200 mg KOH/g, a reversibly blocked polyisocyanate containing carboxyl groups, with an acid value of from 20 to 150 mg KOH/g, along with a b-hydroxylalkylamide having at least two and preferably from 2 to 4 b-hydroxylalkylamide groups per molecule, optionally, typical additives for powdered paints, such as wetting, flow-control or degassing agents, heat- or UV-stabilizers, accelerators such as DBTL, etc., pigments, colorants, fillers, etc. The ratio of the hydroxyl amide groups to carboxyl groups in the binder resin is advantageously between 0.5 and 1.5.

For the coating system according to the invention, polyesters that have hydroxyl numbers in the range from 20 to 200 mg KOH/g, preferably 30 to 120 mg KOH/g, and glass transition temperatures (DSC) of >40° C. are suitable as carboxyl-terminated polyester resins.

The preparation of these hydroxyl-terminated polyester resins is done in a known manner by jointly heating multivalent, e.g., divalent alcohols with multivalent, preferably divalent aliphatic, cycloaliphatic or aromatic carboxylic acids in the presence of an esterification catalyst at a temperature up to approximately 250° C., and toward the end of the reaction under reduced pressure.

The reversibly blocked polyisocyanates containing carboxyl groups are characterized essentially by the following general formula (1):

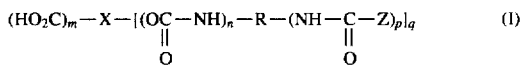  (I)

in which

X stands for a linear or branched aliphatic or cycloaliphatic radical with a valence of (q n+m);

R stands for a linear or branched aliphatic or cycloaliphatic radical with a valence of (n+p);

Z stands for the radical of an isocyanate-blocking agent Z—H;

m stands for a number from 1 to 3, preferably 1;

n a number from 1 to 4, preferably 1 to 2;

p a number from 1 to 4, preferably 1 to 2;

q a number from 1 to 4, preferably 1 to 2;

and the sum of p+q is greater than 2.

The preparation of the reversibly blocked isocyanate containing carboxyl groups is done by known processes, for instance by reacting a hydroxycarboxylic acid with polyisocyanate in the presence of a blocking agent under heat and an N2 atmosphere and in solution, and subsequent isolation of the additive formed, analogously to the processes described in DE-A 3 232 463. Preferred starting materials are in particular 2, 2-bis (hydroxymethyl)propionic acid, as the hydroxycarboxylic acid; isophorone diisocyanate or hexamethylene diisocyanate or prepolymers or oligomers obtainable from them by self-addition, as the polyisocyanates; and lactams, preferably î-caprolactam, as the blocking agents.

The b-hydroxyalkylamides used in the coating system according to the invention must contain at least two b-hydroxy-alkylamide groups per molecule, and they are essentially characterized by the following formula (I):

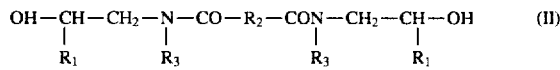 (II)

in which $R_1$ stands for identical or different alkyl radicals having from 1 to 4 carbon atoms, or hydrogen $R_2$ stands for an aliphatic, cycloaliphatic, araliphatic or aromatic radical;

$R_3$ stands for

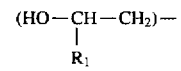

or identical or different alkyl radicals having from 1 to 4 carbon atoms, or hydrogen.

For the coating system according to the present invention, b-hydroxyalkylamides that are especially preferred are as follows:

N,N'-di(b-hydroxyethyl)acetamide
bis(b-hydroxyethyl)adipamide
bis(b-hydroxypropyl)adipamide
bis[N,N'-di(b-hydroxyethyl)adipamide
bis[N,N'-di(b-hydroxypropyl)adipamide.

The preparation of the b-hydroxyalkylamides is carried out in a known manner by reacting the esters of the corresponding diacarboxylic acid with alkanolamines in the presence of heat.

In the coating system of the invention, if good technical painting properties are to be attained, a ratio of 0.5 to 1.5, preferably 0.8 to 1.2, between the b-hydroxyalkylamide groups and the carboxyl groups of the reversibly blocked, carboxyl-group-containing polyisocyanates according to the invention is required. Moreover, if good technical painting properties are to be attained, b-hydroxyalkylamides or mixtures thereof must have a mean b-hydroxyalkylamide functionality of 2 to 4.

The coating systems according to the invention are preferably provided in the form of a powdered paint by the melt coextrusion of all the components at temperatures between 80° and 130° C. The extrudate is then cooled, ground and screened to a particle size of <90 mm. In principle, other processes for preparing the coating system are also suitable, such as mixing the components in solution with ensuing settling out or distillative removal of the solvent, but these other processes have little practical value.

The use of the coating systems according to the present invention for providing protective coats with good weathering resistance and matte surfaces is done by the usual processes for powdered paints, such as by means of an electrostatic powdered paint spray device, by the triboelectric or corona processes, or by the fluidized bed process, and so forth.

However, while the application of powdered compositions is preferred, the coating system according to the invention can also be applied as a solution, by which means once again matte coatings with good technical painting properties are obtained.

The coating systems according to the invention have good storage stability at normal ambient temperatures, and after cross-linking between 150° and 220° C. exhibit good mechanical properties and have smooth and at the same time matte surfaces. They excel in weather resistance and moreover are absolutely unobjectionable toxicologically.

The following examples, present illustratively without limitations, characterize the preparation and the properties of the coating system according to the invention, considered with Table 1.

EXAMPLE A

Hydroxyl-terminated Polyesters 309.2 g (2.97 mols) of neopentyl glycol, 136.7 g (2.20 mols) of ethylene glycol, and 14.8 g (0.11 mols) of trimethylol propane are placed in a two-liter esterification reactor, equipped with a temperature sensor, agitator, reflux column and distillation bridge, and melted at 140° C., in an $N_2$ atmosphere that is maintained for the entire reaction time. While agitation is carried out, 731.1 g (4.40 mols) of terephthalic acid and 0.6 g of esterification catalyst are added. After the internal temperature is raised in increments, the reaction is continued until such time as no further distillate appears. In a vacuum of 20 mbar, condensation is carried out until a melt viscosity of approximately 20 Pas at 160° C. is reached. The polyester obtained has an acid value of <2 mg KOH/g, a hydroxyl number of 48 mg KOH/mg, an ICI melt viscosity at 160° of 18 Pas, and a glass transition temperature (DSC) of 64° C.

EXAMPLE B

Reversibly Blocked Polyisocyanate That Contains Carboxyl Groups 135 g (1.0 mols) of 2,2-bis(hydroxymethyl)propionic acid are dissolved, together with 226 g (2.0 mols) of 1-caprolactam in 2 ml of toluene and mixed in an $N_2$ atmosphere at 100° C. within 30 minutes with 444 g (2.0 mols) of isophorone diisocyanate. Agitation is continued for approximately 1 h at approximately 115° C., and then the bulk of the toluene is removed by distillation in a vacuum. The product obtained as a residue is then freed, in a vacuum, of any toluene still adhering to it. The colorless crystals have an acid value of approximately 70 (mg KOH/g) and a pour point of 120° to 128° C.

EXAMPLE C

Bis(b-hydroxyethyl)adipamate 348 g (2 mols) of dimethyladipate and 244 g (4 mols) of ethanolamine are heated in an $N_2$ atmosphere in a reaction vessel, equipped with an agitator, thermometer and distillation attachment, to 110° C. and reacted in reflux for 15 minutes. Next, at the same temperature, the reaction is continued for approximately 3 h with removal of the split-off methanol, and after that the temperature is raised to approximately 148° C. The contents of the reaction vessel are then, after a further 90 minutes in an $N_2$ atmosphere, poured into a porcelain dish and after solidifying are ground. The product obtained has a melting point of from 117° to 120° C. and still contains approximately 1% free ethanolamine.

For all the powder compositions described in Table 1, where parts by weight of compositions 1–4 are disclosed, the following production process was employed:

Preparation of the Powder Coating

The ingredients in the formulation as per each of Examples 1–4 of Table 1 are mixed dry in a Henschel mixer for 30 seconds at 700 rpm and then extruded in a Buss-Co kneader (PLK 46), with a jacket temperature of 100° C., a cooled screw, and a screw speed of 150 rpm. The extrudate is cooled, ground, and screened to <90 mm.

Painting tests and evaluation of the surfaces are done on steel sheets (0.8 mm thick), degreased with trichloroethane, at a firing temperature of 200° C. for 30 minutes and a film thickness of 60 to 80 mm.

TABLE 1

| Examples | 1 | 2 | 3 | 4 |
|---|---|---|---|---|
| OH-Polymer according to Example A Pts-per-wgt | 60 | 60 | 60 | 60 |
| Blocked Polyisocyanate according to Example B Pts-per-wgt | 18.5 | 18.5 | 18.5 | 18.5 |
| Pridmid XL 552[1] Pts-per-wgt | 1.6 | 0.8 | | 1.1 |
| Bis (β-hydroxyethyl)adipamate according to Example C pts-per-wgt | | 1.1 | 2.15 | 0.75 |
| Titanium Oxide (Kronos 2160) pts-per wgt | 33 | 33 | 33 | 33 |
| Resiflow PV 88[2] Pts-per-wgt | 0.6 | 0.6 | 0.6 | 0.6 |
| Benzoin Pts-per-wgt | 0.5 | 0.5 | 0.5 | 0.5 |
| Impact reverse (inch pounds) (ASTMD 2794) | ≈40 | ≈110 | ≈20 | ≈60 |
| Erichsen penetration Index (mm) DIN 53150 | ≈8 | ≈9 | ≈6 | ≈7 |
| Gloss Index DIN 67530, 60° | 7 | 7 | 13 | 8 |

[1]Bis[N,N'-di(β-hydroxyethyl)]adipamat Commercial product of Rohm and Haas
[2]Flow Agent on Polyacrylate Basis Commercial product of Worlée-Chemie GmbH The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A heat-curable, epoxy-free coating system of binder resin on the basis of at least one hydroxyl-terminated polyester resin (a) with a hydroxyl number in the range from 20 to 200 mg KOH/g and a glass transition temperature of at least 40° C., at least one carboxyl-group-containing, reversibly blocked polyisocyanate (b) having at least two blocked isocyanate groups per molecule and an acid value of from 20 to 150 mg KOH/g, and at least one b-hydroxyalkylamide (c) having at least two b-hydroxyalkylamide groups per molecule, and optionally further additives dictated by the usage and processing.

2. The coating system of claim 1, wherein the hydroxyl-terminated polyester resin comprises at least one, multi-valent, linear or branched, aliphatic or cycloaliphatic polyol, and at least one, multi-valent, aliphatic, cycloaliphatic or aromatic carboxylic acid.

3. The coating system of claim 1, wherein the b-hydroxyalkylamide (c) or mixtures thereof have between two and four b-hydroxyalkylamide groups.

4. The coating system of claim 1, wherein between 0.5 and 1.5 blocked isocyanate groups are available per hydroxyl group in the binder resin.

5. The coating system of claim 1, wherein between 0.5 and 1.5 blocked b-hydroxyalkylamide groups are available per carboxyl group in the binder resin.

6. A process for preparing a heat-curable, epoxy-free coating system according to claim 1, comprising extruding components a, b, c and optionally further additives typical for powder coating in the melt at 80° to 130° C., cooling, granulating, grinding, and screening to a particle size of less than 90 mm.

7. In a method of powder coating a substrate by applying and fusing a powdered resin to said substrate, the improvement wherein said powdered resin is the binder resin of claim 1.

8. A method according to claim 7 for producing protective coats with matte surfaces and good weather resistance comprising applying said binder resin by the triboelectric or corona powder spraying process or by the fluidized bed process.

* * * * *